UNITED STATES PATENT OFFICE 2,474,229

RETARDING GROWTH OF MICROORGANISMS IN LIGHT ALCOHOLIC BEVERAGES

Gerald H. Coleman and Paul A. Wolf, Midland, Mich., assignors to The Dow Chemical Company, Midland, Mich., a corporation of Delaware No Drawing. Application January 13, 1947, Serial No. 721,879

13 Claims. (Cl. 99—48)

This invention relates to a method for imparting to light alcoholic beverages increased resistance to attack by microorganisms after the desired fermentation is complete, and to the so-treated products. It relates in particular to a method for retarding such undesired growth in beverages such as beer and sweet and dry wines.

Certain problems, relating to flavor, arise in fermented alcoholic beverages due to the after growth of various microorganisms. Thus, in beer making, when fermentation has reached the desired point and the brew has finally been bottled, it has been found that spoilage may occur in a high percentage of the bottled product unless the beer has been pasteurized. It has long been known, however, that unpasteurized beer has a better flavor (by standards accepted in the trade) than has the pasteurized product. After the main fermentation is complete, a means is desired to stop the growth of those microorganisms in beer which cause undesirable flavors and spoilage, so that a full-flavored and unpasteurized product may be sold safely. Among the principal, though not the only, organisms causing spoilage in beer are bacteria of the Lactobacillus group and yeasts of the Saccharomyces group.

Spoilage problems occur as well in the wine industry, due to the action of microorganisms after the normal and desired fermentation is complete. This is true of both sweet (16 to 21 per cent alcohol) and dry (8 to 16 per cent alcohol) types of wine. While the alcoholic concentration of sweet wines is usually high enough to prevent secondary fermentation due to *Saccharomyces ellipsoideus*, even when these wines contain residual sugar, the alcohol does not prevent the growth of such organisms as *Lactobacillus plantarum*, *Acetobacter aceti*, and other microorganisms. The low alcohol content of dry wines makes them even more susceptible to the injurious action of microorganisms than are the sweet wines, and dry wines containing sugar are often spoiled by fermentation due to *S. ellipsoideus*.

Any agent intended to repress the undesirable growth of microorganisms in beer, ale, porter, stout, wines and similar light (undistilled) alcoholic beverages should be tasteless, odorless, harmless to humans at use concentrations, and should not affect significantly the natural pH of the beverage.

It is accordingly among the objects of the present invention to provide a method for imparting to light alcoholic beverages an increased resistance to attack by microorganisms after the fermentation has been carried to the desired end point. A particular object is to provide such a method whereby beer, ale and similar brewed malt beverages may be made resistant to such attack without necessity for pasteurization and its resulting undesirable flavor changes. Another object is to provide a method for imparting to both sweet and dry wines an increased resistance to attack by microorganisms which foster undesirable microbial activity leading to off-flavors. Related objects include the provision of light alcoholic beverages in a condition resistant to further growth of microorganisms.

It has now been found that the foregoing and related objects may be attained by incorporating in the light alcoholic beverage, usually after the desired degree of fermentation has been reached, a minor amount, usually less than 0.1 per cent by weight and commonly not over 0.05 per cent, of dehydroacetic acid or its soluble neutral salts. Dehydroacetic acid has the structural formula

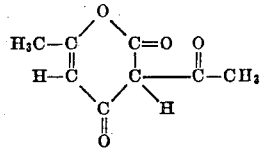

and is also known as 3-acetyl 6-methyl pyrandione-2,4 and exists in both a keto form (illustrated in the formula) and an enolic form. It is essentially neutral but forms neutral sodium, potassium, and ammonium salts, among others. Dehydroacetic acid is odorless, tasteless, and harmless to humans at use concentrations. It is only slightly soluble in water (about 0.1 per cent by weight) but dissolves to form clear solutions in ethyl alcohol and in aqueous alcoholic solutions such as the beverages here concerned. The sodium, potassium and ammonium salts are readily soluble.

The following examples illustrate the practice of the invention:

EXAMPLE 1

The yeasts most commonly used in brewing are known to be very active on the added sugar of "primed" beer, and on the residual sugar of other beer, creating cloudiness and off-flavors. In some cases the after-fermentation causes after-bitter tastes and the odor of spoiled fruit. Various acetic acid forming bacteria and lactic acid forming bacteria, produce excessive acidity and other disorders in beer, including veiling, ropiness, and other evidences of colloidal disturbances. The white or grey membranous growth atop barrelled and bottled beer is often caused by a yeast such as *Saccharomyces membranafaciens*, and gives lager beers, for example, a bad flavor and a musty odor. Typical members of several of the commoner contaminating genera were used to inoculate a malt yeast agar plate in a Petri dish, containing various amounts of dehydroacetic acid, based on the weight of nutrient. Typical results of these preliminary tests in vitro are given in the following table, wherein the first of each pair of numbers is the maximum amount of dehydroacetic acid which could be present without affecting the growth of the organism, while the second numerical value represents the minimum amount of dehydroacetic acid required in these tests to inhibit completely the growth of the microorganism concerned. Although molds are not common in beer, they may contaminate wooden barrels in which beer may be shipped, and then are found to give beer a musty flavor. Accordingly, the table includes tests on two common molds.

TABLE 1

| Organism | Dehydroacetic Acid, Per Cent by Weight of Medium | |
|---|---|---|
| Yeast: *Saccharomyces cerevisiae* | 0.01 | 0.025 |
| Bacteria: *Lactobacillus plantarum* | 0.08 | 0.10 |
| Molds: | | |
| *Aspergillus niger* | 0.025 | 0.05 |
| *Rhizopus nigricans* | 0.01 | 0.025 |

The results of these tests give indication that dehydroacetic acid is effective at suitably low concentrations in retarding the growth of the principal types of beer-contaminating microorganisms. The example which follows illustrates the practice of the invention in commercially produced beer.

EXAMPLE 2

Since beers from different breweries each have characteristic pH values (usually between 3.8 and 5.0) and since changes in pH may induce undesirable changes, such as protein breakdown, it is deemed advisable that any agent added to the beer should leave the pH at the level in the finished beer so as not to alter the colloidal balance. Accordingly, as a preliminary test of the suitability of dehydroacetic acid as a constituent of beer, amounts of 0.025, 0.05 and 0.075 per cent of dehydroacetic acid were dissolved in samples of a beer having an original pH of 4.50, and it was found that the treated beers had pH values of 4.50, 4.45 and 4.45, respectively. No sedimentation was observed as a result of the treatment. The colloidal balance was assumed to have been unaffected. The similar treatment of another beer, original pH 4.4, with 0.025 and 0.050 per cent of the sodium salt of dehydroacetic acid, gave final pH values of 4.45 and 4.55, respectively. No adverse effects were noted.

Supposedly pure cultures of microorganisms common to breweries, brewing materials and brewing operations, were maintained in bottled beer until growth was at a maximum, and were transferred repeatedly to suitable beer. Maximum growth in bottled beer was usually attained in from 1 to 8 days. Microscopic examinations were made frequently to determine purity and growth activity of the individual cultures. After suitable beer for the maintenance of each culture had been established, bottles of such unpasteurized beer were treated by dissolving therein varying amounts of dehydroacetic acid or one of its salts, and were seeded with 1 milliliter of beer containing the actively growing microorganism. The seeded beer was examined at regular intervals during shelf aging, to observe sediment, floating particles and veiling or haze formation. The bottles were then opened and the sediment was examined microscopically to determine its nature and the viability of the test organism. One milliliter of the sediment from each bottle was plated into Petri plates and 10 milliliters of potato dextrose agar or nutrient agar was added. Incubation was at room temperature for 30 days. Control plates were made of the respective agars alone as well as with samples of the uninoculated beer. All test organisms grew vigorously in all of the controls. The observations made during the tests reported above are reproduced in the following tables:

TABLE 2

*Appearance of inoculated beer after 30 days at room temperature*

| Added Chemical | | Test Organism | Sediment in Bottles | Microscopic Examination of Sediment |
|---|---|---|---|---|
| Kind | Per Cent | | | |
| Control | 0 | None | Very slight | Trace of albuminous matter. |
| Dehydroacetic acid | 0.05 | *S. cerevisiae* | Moderate | Many dead rods. |
| Do | 0.05 | Lactobacillus species | do | Rare rods, scanty dead yeast. |
| Do | 0.05 | Mixed culture | do | Dead rods, yeast and mold. |

The same observations apply to beer containing 0.05 per cent of the sodium salt of dehydroacetic acid. (NOTE.—The "mixed culture" is one which had been isolated from beer and consisted of bacillary rods, molds and yeast.)

At intervals during the shelf-aging of the test beer, tests showed that no detectable taste or odor was attributable to the dehydroacetic acid compounds.

TABLE 3

*Petri plate results at 30 days*

| Microorganisms | Control Growth in Beer | Per Cent of Dehydroacetic Acid in Beer, by Weight | | | | | | |
|---|---|---|---|---|---|---|---|---|
| | | 0.001 | 0.005 | 0.01 | 0.025 | 0.05 | 0.075 | 0.10 |
| *S. cerevisiae* | ++++ | ++++ | +++ | + | ± | ± | − | − |
| Lactobacillary rods | ++++ | ++++ | ++++ | ++++ | ± | ± | − | − |
| Mixed culture | ++++ | ++++ | ++++ | ++++ | +++ | ± | − | − |

Although the level of efficiency of dehydroacetic acid was at or below 0.05 per cent in the inoculated beers, and the inoculation was greatly in excess of the counts found commonly in commercial beer, the possibility of sporadic appearances of infection make it desirable at present to recommend the use of about 0.05 per cent of this agent when control is desired. Lesser amounts are effective in imparting to beer an increased resistance to growth of the typical microorganisms, and greater amounts, over about 0.1 per cent appear never to be required.

EXAMPLE 3

Sweet table wines were inoculated with 5 per cent by volume of an actively growing culture of the so-called champagne strain of *S. ellipsoideus*. Solutions of known concentrations of dehydroacetic acid and of its sodium salt were previously made in wine of the type to be tested, and measured volumes of these solutions were added to known volumes of the inoculated wines. The bottles were stoppered with cotton plugs and let stand at room temperature. Both dehydroacetic acid and its sodium salt were effective in preventing growth of the heavy yeast inoculum, at concentrations in the order of 0.05 to 0.07 per cent. For this use, the sodium salt is deemed more desirable than dehydroacetic acid, partly because of the greater ease with which it can be dissolved. The treated wines had a normal taste, with none of the off-flavors commonly traceable to secondary fermentation or to chemical agents now used in wine. Control samples, both with and without the heavy yeast inoculum, had off-flavors indicative of microorganic activity. Results similar to those reported above are obtained with both sweet and dry wines, with and without residual sugars, as the sodium salt of dehydroacetic acid (or the parent compound itself) effectively inhibits the growth of the common wine-contaminating microorganisms. The invention is not limited, in its application to wines, to the "still" wines suggested above. It may be used as well with sparkling wines, in which case an appropriate state for the introduction of the dehydroacetic acid compound is while the wine is frozen and the cork removed to disgorge the sediment incident to the secondary fermentation which produces the "sparkle."

With wines, as with beer, ale and other fermented brews, the invention is usually carried out by adding the dehydroacetic acid or salt thereof to the beverage after principal fermentation has reached the desired end point. Further fermentation and bacterial action are both repressed by this treatment. This appears to be the most practical manner of carrying out the invention, but it is possible, as well, to add the dehydroacetic acid compound to the fruit juice before fermentation, in an amount insufficient to prevent the desired primary fermentation, but sufficient to inhibit secondary fermentation or the growth of undesirable microorganisms.

No attempt has been made herein to name all of the microorganisms which, on occasion, have been found to grow in light alcoholic beverages, but the results indicate that an increased resistance to their growth is imparted by dehydroacetic acid and its neutral sodium or other soluble salts when present in small quantities which ordinarily need not exceed about 0.1 per cent of the weight of the beverage.

The treatment of foods rich in carbohydrates with dehydroacetic acid or its salts is described and claimed by us in an application filed concurrently herewith, Serial No. 721,877. The use of the same agents to treat foods rich in proteins and fats is claimed in another of our concurrently filed applications, Serial No. 721,878. Antifungal wrapping sheets containing these agents form the subject matter of yet another application filed by us concurrently herewith, Serial No. 721,880.

We claim:

1. The method of imparting to light alcoholic beverages an increased resistance to attack by microorganisms which comprises dissolving in such beverage a minor but effective amount of a compound selected from the class consisting of dehydroacetic acid and its sodium, potassium and ammonium salts.

2. The method of imparting to light alcoholic beverages in increased resistance to attack by microorganisms which comprises dissolving in such beverage an effective amount, up to about 0.1 per cent by weight, of a compound selected from the class consisting of dehydroacetic acid and its sodium, potassium and ammonium salts, after the desired degree of fermentation has been reached.

3. The method of imparting to beer an increased resistance to attack by microorganisms which comprises dissolving therein an effective amount, up to about 0.1 per cent by weight, of dehydroacetic acid, after the desired degree of fermentation has been reached.

4. The method of imparting to beer an increased resistance to attack by microorganisms which comprises dissolving therein an effective amount, up to about 0.1 per cent by weight, of the neutral sodium salt of dehydroacetic acid, after the desired degree of fermentation has been reached.

5. The method of imparting to wine an increased resistance to attack by microorganisms which comprises dissolving therein an effective amount, up to about 0.1 per cent by weight, of dehydroacetic acid, after the desired degree of fermentation has been reached.

6. The method of imparting to wine an increased resistance to attack by microorganisms which comprises dissolving therein an effective amount, up to about 0.1 per cent by weight, of the neutral sodium salt of dehydroacetic acid, after the desired degree of fermentation has been reached.

7. The method as claimed in claim 5, wherein the wine being treated is one having a significant residual sugar content in its normal condition.

8. The method as claimed in claim 6, wherein the wine being treated is one having a significant residual sugar content in its normal condition.

9. A light alcoholic beverage containing up to about 0.1 per cent by weight of a compound selected from the class consisting of dehydroacetic acid and its sodium, potassium and ammonium salts dissolved therein.

10. Beer, containing up to about 0.1 per cent by weight of dehydroacetic acid dissolved therein.

11. Beer, containing up to about 0.1 per cent by weight of the sodium salt of dehydroacetic acid dissolved therein.

12. Wine, containing up to about 0.1 per cent by weight of dehydroacetic acid dissolved therein.

13. Wine, containing up to about 0.1 per cent by weight of the sodium salt of dehydroacetic acid dissolved therein.

GERALD H. COLEMAN.
PAUL A. WOLF.

REFERENCES CITED

The following references are of record in the file of this patent:

UNITED STATES PATENTS

| Number | Name | Date |
|---|---|---|
| 2,157,633 | Schapiro | May 9, 1939 |
| 2,229,204 | Boese | Jan. 21, 1941 |
| 2,265,522 | Farkas | Dec. 9, 1941 |
| 2,374,620 | Prinz | Apr. 24, 1945 |

FOREIGN PATENTS

| Number | Country | Date |
|---|---|---|
| 115,695 | Australia | Aug. 6, 1942 |

OTHER REFERENCES

Ind. Eng. Chem., vol. 32, pages 16–22, 1940, Article by A. B. Boese, Jr.